(12) United States Patent
Schütz

(10) Patent No.: US 8,919,812 B2
(45) Date of Patent: Dec. 30, 2014

(54) STEERING WHEEL HAVING AN AIR BAG MODULE

(75) Inventor: Dominik Schütz, Heimbuchenthal (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 13/574,010

(22) PCT Filed: Feb. 18, 2011

(86) PCT No.: PCT/DE2011/000147
§ 371 (c)(1),
(2), (4) Date: Jul. 19, 2012

(87) PCT Pub. No.: WO2011/100960
PCT Pub. Date: Aug. 25, 2011

(65) Prior Publication Data
US 2012/0292895 A1    Nov. 22, 2012

(30) Foreign Application Priority Data

Feb. 18, 2010    (DE) .......................... 10 2010 008 535

(51) Int. Cl.
*B60R 21/203*    (2006.01)
(52) U.S. Cl.
CPC .................................. *B60R 21/2037* (2013.01)
USPC ........................................ 280/731; 280/728.2
(58) Field of Classification Search
CPC ............ B60R 21/2037; B60R 21/2035; B60R 21/203; B60R 21/05
USPC ......... 280/731, 728.2, 750; 200/61.54, 61.55, 200/61.56, 61.57
See application file for complete search history.

(56) References Cited

U.S. PATENT DOCUMENTS

| | | | | |
|---|---|---|---|---|
| 5,627,352 A | * | 5/1997 | Suzuki et al. | 200/61.54 |
| 6,244,620 B1 | * | 6/2001 | Bathon et al. | 280/731 |
| 6,457,379 B1 | * | 10/2002 | Mirone | 74/552 |
| 7,377,543 B2 | * | 5/2008 | Boullosa Vazquez et al. | 280/731 |
| 7,438,312 B2 | * | 10/2008 | Boullosa Vazquez et al. | 280/731 |
| 7,547,042 B2 | * | 6/2009 | Chapelain et al. | 280/731 |
| 2003/0075905 A1 | | 4/2003 | Derrick et al. | |
| 2003/0197355 A1 | | 10/2003 | Bohn et al. | |
| 2008/0136073 A1 | | 6/2008 | Kreuzer | |
| 2009/0085334 A1 | | 4/2009 | Matsu et al. | |

FOREIGN PATENT DOCUMENTS

| | | | |
|---|---|---|---|
| DE | 20117140 | 5/2002 | |
| DE | 202006016948 | 3/2007 | |
| EP | 1043198 | 10/2000 | |
| ES | 2135999 | 11/1999 | |
| ES | 2135999 A1 * | 11/1999 | ............ B60R 21/203 |

* cited by examiner

*Primary Examiner* — Keith Frisby
(74) *Attorney, Agent, or Firm* — Tarolli, Sunheim, Covell & Tummino LLP

(57) ABSTRACT

A steering wheel for an automotive vehicle comprising an airbag module and a detachable snap-fit connection for fastening the airbag module to the steering wheel includes a detent pin that is positively embedded in the foamed steering wheel cover of the steering wheel.

20 Claims, 5 Drawing Sheets

STEERING WHEEL HAVING AN AIR BAG MODULE

RELATED APPLICATIONS

This application corresponds to PCT/DE2011/000147, filed Feb. 18, 2011, which claims the benefit of German Application No. 10 2010 008 535.9, filed Feb. 18, 2010, the subject matter, of which are incorporated herein by reference in their entirety.

BACKGROUND OF THE INVENTION

The invention relates to a steering wheel for accommodating an airbag module by means of a detachable snap-fit connection, wherein the steering wheel includes a steering wheel skeleton and a foamed steering wheel cover and wherein a detent pin is provided as part of the snap-fit connection. Furthermore, the invention relates to an airbag module provided for being accommodated in the steering wheel as well as an assembly of a steering wheel for an automotive vehicle, an airbag module and a detachable snap-fit connection for fastening the airbag module to the steering wheel.

Such arrangement is known, for instance, from the German Utility Model DE 201 17 140 U1. In the case of assemblies and steering wheel-airbag module arrangements of this type the steering wheel and the airbag module are two prefabricated and separate components connected to each other by a detachable snap-fit connection. High demands as regards tolerance and gap widths are made to the connection between the steering wheel and the airbag module, as they are provided in the driver's direct field of vision and grasp. Moreover, the connection between the airbag module and the steering wheel must ensure extreme holding forces upon release of the airbag module. At the same time, the connection between the airbag module and the steering wheel is to be detachable in a quick and simple manner for mounting the steering wheel in the vehicle and dismounting it during workshop operation. For this purpose, snap-fit connections between the airbag module and the steering wheel have established themselves in the meantime.

When, in addition, for actuating the horn the airbag module is to be movable also in axial direction toward the steering wheel, the constructional costs for the detachable connection between the steering wheel and the airbag module are considerably increased, as the visible gap widths between the module and the foamed steering wheel are to be kept as little as possible while the mobility of the module must be guaranteed.

Usually the module is engaged vis-à-vis the steering wheel skeleton in the form of a metal pressure die casting, mostly of magnesium, in order to ensure that the module is safely anchored at the steering wheel upon release of the airbag. However, it might happen that inaccuracies of tolerance which affect the gap between the module and the foamed steering wheel cover occur during foam-covering of the steering wheel skeleton.

SUMMARY OF THE INVENTION

Therefore the object underlying the invention is to provide a steering wheel that takes the high demands regarding positioning and guiding and the great holding forces required upon release of the airbag module into account.

For a steering wheel of the type mentioned in the beginning this object is achieved in accordance with the invention by the fact that the detent pin is positively embedded in the foamed steering wheel cover.

As the detent pin is positively embedded in the foamed steering wheel cover, upon engaging the module with the detent pin the module is primarily aligned vis-à-vis the foamed steering wheel cover, whereby possible inaccuracies between the foamed steering wheel cover and the steering wheel skeleton do not affect the gap between the module and the steering wheel cover visible on the driver's side. Also the required free space for the horn movement of the module is ensured.

Preferably two engaging concepts are combined, i.e. a first snap-fit connection having great holding forces and larger tolerances and a second snap-fit connection having lower holding forces and clearly reduced tolerances. The connection exhibiting great holding forces is usually formed between the airbag module and the steering wheel skeleton, the connection exhibiting a reduced tolerance and higher dimensional stability is formed, on the other hand, between the airbag module and the foamed steering wheel cover. In the latter connection detent hooks are provided at the airbag module for engaging in undercuts at the detent pin foamed in the steering wheel cover.

The invention further provides an assembly of a steering wheel, an airbag module and a detachable snap-fit connection in which a tolerance optimized manufacture is possible and in which the mounting forces are reduced. The positive embedding of the detent pin in the foamed steering wheel cover permits very accurate positioning of the detent pin during insertion in the foaming tool. Embedding the detent pin in the foamed steering wheel cover moreover has the advantage that, due to the properties of the foam, small tolerances can be compensated for and in total very small gap widths can be obtained during mounting the airbag module.

A very high strength of the snap-fit connection is obtained by forming an engaging contour at the detent pin to interact with a corresponding engaging contour at the steering wheel skeleton.

According to a further preferred embodiment, the detent pin can also have, instead of a snap-fit connection to the steering wheel skeleton, a different type of connection with undercut, e.g. a screw connection. In this case the detent pin is preferably screwed to the steering wheel skeleton by means of a central or eccentric bolt, wherein a head end of a stud bolt substantially T-shaped in cross-section fixes the detent pin toward the steering wheel skeleton or at least prevents a movement of the detent pin in the direction away from the steering wheel skeleton or restricts the same to a predetermined extent.

In accordance with a preferred embodiment, the detent pin can thus be fixed to be immobile at the steering wheel skeleton.

According to another embodiment, the detent pin can be arranged to be movable relative to the steering wheel skeleton. The mobility can be restricted to a radial direction, i.e. to a direction perpendicular to the support surface of the detent pin on the steering wheel skeleton (or perpendicular to the central axis of the detent pin or of the stud bolt holding the same). This permits an adjustability of the detent pin vis-à-vis the steering wheel skeleton during foam-covering.

This snap-fit or screwed connection acting in addition to the positive embedding is adapted to absorb by far greater forces that occur, for instance, upon release of the airbag module. When designing the snap-fit connection in an appropriate manner, thus additional catch or safety hooks or straps for holding or catching the module upon the pyrotechnical release thereof can be dispensed with.

Particularly good guiding during assembly is obtained when the detent pin has a substantially cylindrical shape and includes a guiding portion interacting with a guiding sleeve at the airbag module.

Especially when the airbag module is to be movably supported—e.g. as horn member—in the steering wheel, a guiding of a compression spring interacting with the airbag module is possible in a simple and advantageous manner by an axial recess in the detent pin.

Preferably the invention relates to a steering wheel in which at the detent pin a first engaging contour interacting with a corresponding second engaging contour at the airbag module is formed, wherein the first engaging contour is preferably formed as a substantially tangential recess in the detent pin and/or wherein the second engaging contour is preferably formed as a spring member, especially as a spring wire.

It is especially preferred that at the detent pin a third engaging contour is formed so as to interact with a corresponding fourth engaging contour at the steering wheel skeleton, the third engaging contour being preferably in the form of a substantially radial, especially T-shaped projection at a lower end of the detent pin and/or the fourth engaging contour being preferably formed as an especially hook-shaped step at the steering wheel skeleton.

It is further preferred that the detent pin is formed substantially cylindrically and/or at least in an upper area has a substantially cylindrical outer contour formed as a guide for a guiding sleeve provided at the airbag module and/or wherein the detent pin has a substantially H-shaped configuration in its cross-section.

Also it is preferred that the detent pin includes an axial guiding portion, especially a recess and/or an elevation for receiving and guiding a compression spring acting on the airbag module, the axial guiding portion preferably being formed as a separate insert accommodated in an especially cup-shaped receiving compartment of the detent pin.

In one embodiment the detent pin is additionally fixed at the steering wheel skeleton at least in axial direction, the fixing being preferably formed as engagement and/or as screw joint.

It is further preferred that the detent pin has at its upper end a first especially cup-shaped receiving compartment and/or that the detent pin has at its lower end a second, especially inversely cup-shaped receiving compartment in which a preferably trapezoidal, especially conical extension of the steering wheel skeleton is accommodated and/or that the detent pin has an axial through passage, the through passage especially connecting the first and second receiving compartments and/or a central axis of the axial through passage being parallel to but spaced apart from a central axis of the detent pin or an outer contour formed at the same.

Preferably the steering wheel is designed so that between the detent pin and the steering wheel skeleton and/or between a bolt, especially a bolt accommodated between an axial through passage and a first and/or second receiving compartment of the detent pin and tightly connected, especially screwed with the steering wheel skeleton, a distance or contact-free area is formed which is preferably at least partially filled with a foam material of the foamed steering wheel cover.

Preferably two or three or four detent pins are provided at the steering wheel.

Furthermore, the subject matter of the invention is an airbag module provided and formed for fastening to a steering wheel by means of a detachable snap-fit connection, wherein the steering wheel has at least one of the afore-mentioned features. The airbag module includes an airbag and an inflator as well as at least one guiding sleeve as part of the snap-fit connection.

Preferably two or three or four guiding sleeves are provided for receiving a respective detent pin.

Moreover, the subject matter of the invention is an assembly of a steering wheel for an automotive vehicle, an airbag module and a detachable snap-fit connection for fastening the airbag module to the steering wheel, the steering wheel, the airbag module and/or the detachable snap-fit connection including at least one of the afore-listed features.

Further features are the subject matter of the subclaims.

BRIEF DESCRIPTION OF THE DRAWINGS

Hereinafter the invention will be illustrated in detail by way of preferred embodiments including further features and advantages with reference to the enclosed drawing disclosing in FIG. 1 a top view on a steering wheel according to the invention as part of the assembly according to the invention, FIG. 2 a perspective, partially cut part view of the steering wheel and of the airbag module according to a first embodiment of the invention, FIG. 3 a part sectional view according to a first embodiment of the invention, FIG. 4 a perspective part view of the steering wheel skeleton before foam-covering including three detent pins screwed thereon according to a second or third embodiment of the invention, FIG. 5 a part sectional view of the steering wheel skeleton before foam-covering including detent pins tightly screwed thereon according to a second embodiment of the invention, FIG. 6 a perspective, partly cut part view of the steering wheel and of the airbag module prior to engagement according to a third embodiment of the invention in which the detent pin is also spaced apart from the head of the stud bolt and is positioned on the steering wheel skeleton through the foamed steering wheel cover, FIG. 7 a perspective partly cut part view of the steering wheel and of the airbag module after engagement according to the third embodiment of the invention.

DESCRIPTION OF EXEMPLARY EMBODIMENTS

Figure 1:
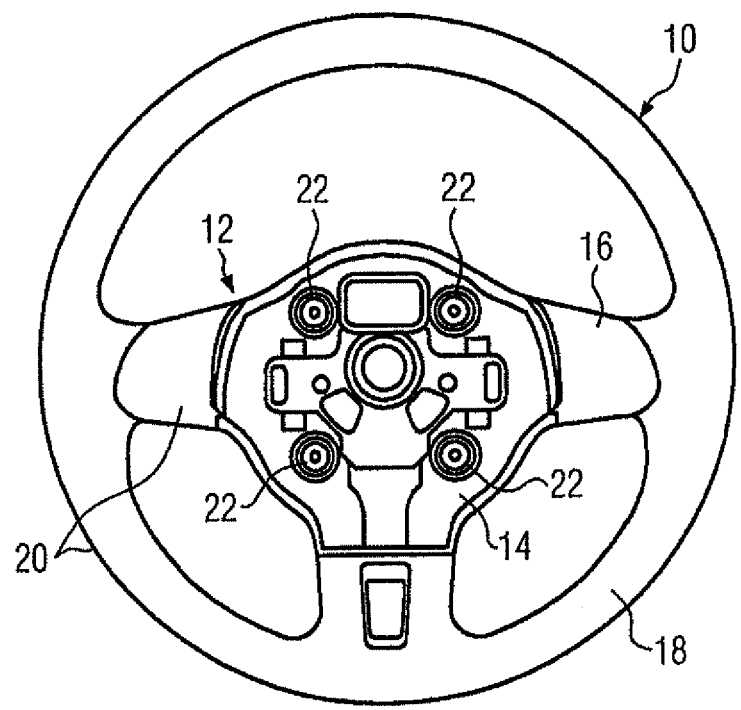

In FIG. 1 a steering wheel 10 is shown which includes a metallic steering wheel skeleton 12 having a support plate 14, steering wheel spokes 16 and a steering wheel rim 18. The steering wheel rim 18, the steering wheel spokes 16 and parts of the support plate 14 are foam-covered with foam forming the steering wheel cover 20. In the area of the support plate 14 four detent pins 22 are disposed at the steering wheel. These four detent pins serve for guiding and fastening an airbag module known per se of which only a part of the casing or of the inflator support 24 is shown in FIG. 3.

Figure 2:
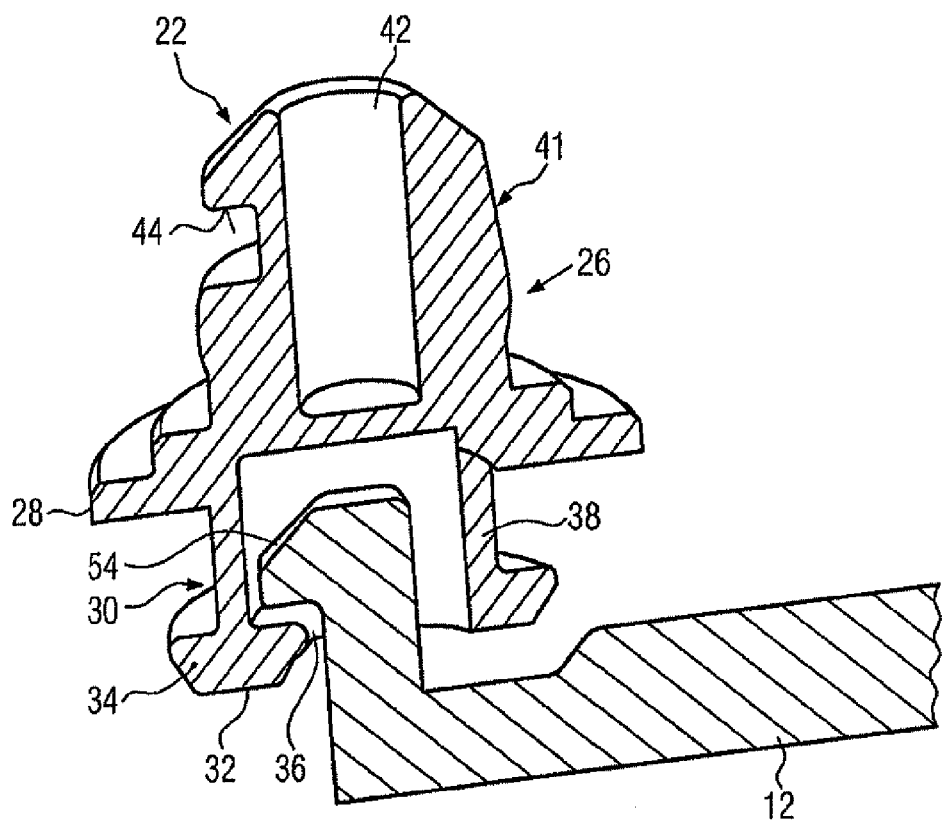
Figure 3:
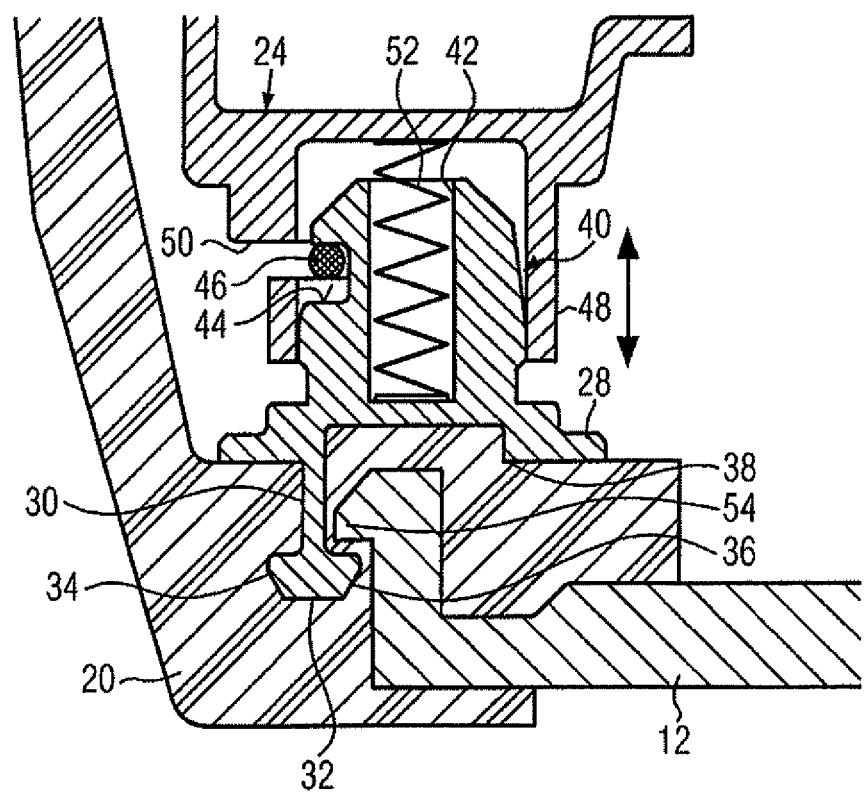

The detent pin 22 illustrated in more detail in the FIGS. 2 and 3 includes a multiple-stepped cylindrical body 26 at which a peripheral collar 28 is formed. The detent pin is supported flush with said peripheral collar 28 on the part of the steering wheel cover 20 disposed in the area of the support plate 14. Starting from said collar 28 the detent pin has a cylindrical anchoring portion 30 embedded in the foam of the steering wheel cover 20. The front end of the anchoring portion is provided with a peripheral thickening 32 forming a respective peripheral edge 34 and 36 both outside and inside. The anchoring portion 30 further includes an indentation 38 starting from the open end face and extending to the area of the collar 28. Said indentation is arranged so that it points toward the support plate 14. On the side of the collar 28 opposite to the anchoring portion 30 the detent pin includes a guiding portion 40 having a spherical outer contour. Starting from the end face an axial recess 42 is formed in said guiding portion. At the side located radially outside in the mounting position of the detent pin the guiding portion 40 has an indentation 44 interacting with a detent spring 46 fixed at the airbag module or the inflator support 24 formed at the same or connected to the same. In this embodiment having a movable airbag module 24 the height of the indentation 44 is greater than the diameter of the detent spring 46 so that an axial mobility of the airbag module is possible for actuating the horn.

At the inflator support 24 four guiding sleeves 48 corresponding to the detent pins 22 are formed which enclose the spherical guiding portion of the detent pin. Radially outside each of said guiding sleeves has an indentation 50 through which the detent spring 46 can move in the direction of the detent pin.

In each of the recesses 42 of the guiding portions 40 a compression spring 52 contacting the bottom of the inflator support 24 and loading the same toward its home position is guided.

During manufacture of the steering wheel the steering wheel skeleton 12 and the detent pins are inserted in a foaming mold. When closing the mold the detent pins are positioned so that detent hooks 54 at the support plate 14 protrude into the indentations 38 of the anchoring portions 30 and engage behind the edges 36 pointing inwards. The closed foaming mold is then filled with steering wheel foams known per se so that the steering wheel cover is formed. By virtue of the open design of the anchoring portions and the indentations in the same, foam can flow into the interior of the anchoring portions during the foaming operation and can safely fix the detent pins in the foam and in the steering wheel cover. By interaction of the detent hooks 54 at the support plate 14 and the inner edge 36 of the anchoring portions acting as engaging contour an additional fixing of the detent pins to the support plate and the steering wheel skeleton is obtained. This connection is adapted to withstand even the forces occurring upon release of the airbag module and to safely fix the module.

The detent pins can also be secured to the steering wheel skeleton, according to a further preferred embodiment as described hereinafter by way of the FIGS. 4 to 7, by a connecting bolt, especially by a stud bolt 154. This can be effectuated both from the open end face of the anchoring portion and from the open end face of the guiding portion. In contrast to the narrowly tolerated positioning from the steering wheel cover, this connection can be made with larger tolerances especially in the radial direction.

Figure 4:
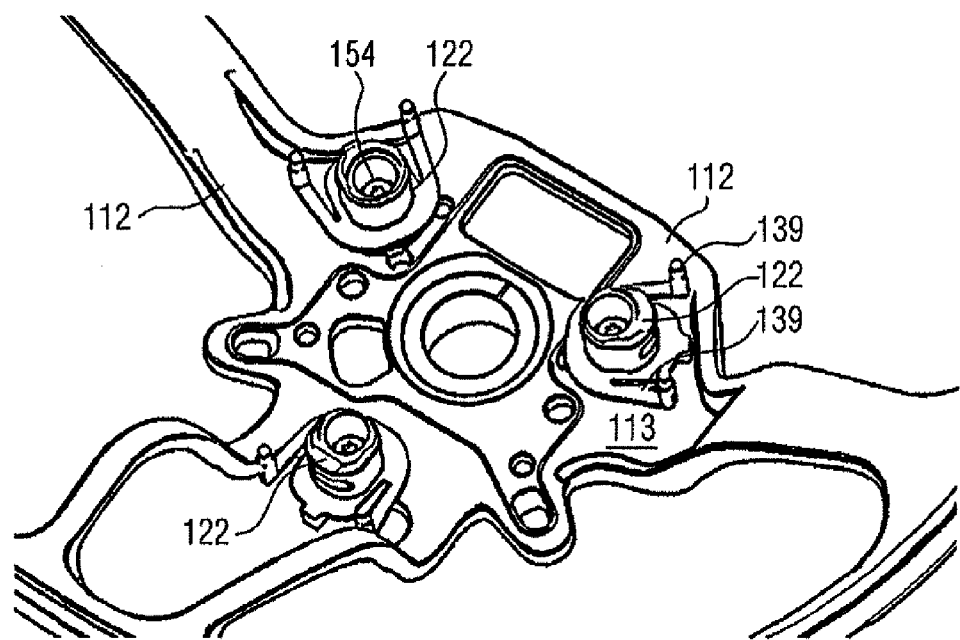

FIG. 4 shows a perspective partial view of a steering wheel skeleton 112 before foam-covering including three detent pins 122 screwed thereon by respective stud bolts 154 in accordance with a second and a third embodiment of the invention.

Figure 5:
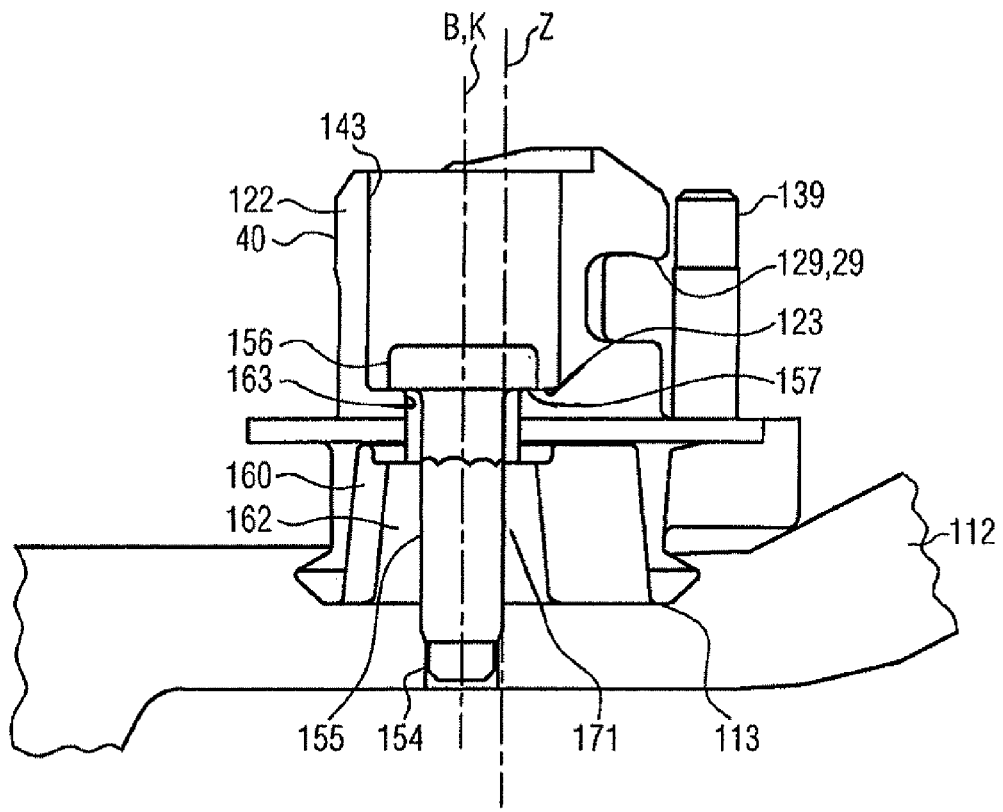

FIG. 5 illustrates one of the screwed detent pins of the steering wheel skeleton 112 according to FIG. 4 before foam-covering in accordance with a second embodiment of the invention in which a support area 157 of the stud bolt 154 presses onto a pressing area 123 of the detent pin 122, thereby the detent pin 122 being fixed or adapted to be fixed onto the steering wheel skeleton. The pressing area 123 of the detent pin 122 is formed in parallel to a support area 113 of the steering wheel skeleton on which the detent pin is movable to a predetermined extent so as to compensate for inaccuracies of tolerance when inserting in the foaming mold. The detent pin is finally fixed or screwed on the steering wheel skeleton preferably after foam-covering.

In order to allow for the optimum positioning of the detent pin on the steering wheel skeleton, the detent pin 122 has at its upper end a first especially cup-shaped receiving compartment 143 for the screw head 156. Furthermore, the detent pin 122 has at its lower end a second inversely cup-shaped receiving compartment 160 in which a preferably trapezoidal, especially conical, extension 162 of the steering wheel skeleton 112 is received. However, also a configuration without such second receiving compartment and/or without such extension 162 of the steering wheel skeleton is possible.

Figure 6:
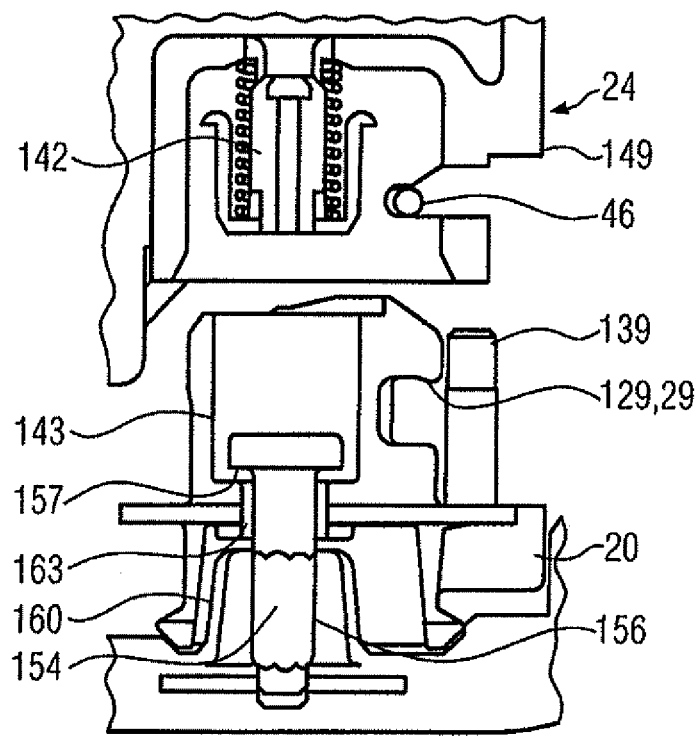
Figure 7:
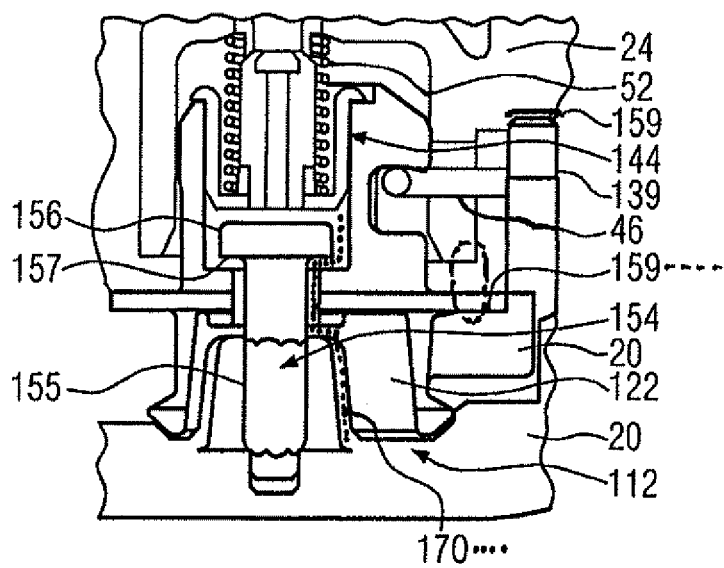

Preferably the detent pin 22, 122 includes, as illustrated in FIGS. 6 and 7, an axial guiding portion, especially a recess 42 (FIG. 2) and/or an elevation 142 for receiving and guiding a compression spring 52 acting on the airbag module. The axial guiding portion is preferably in the form of a separate insert 144 received in an especially cup-shaped receiving compartment 143 of the detent pin 122.

The detent pin 122 shown in FIGS. 4 to 7 further includes an axial through passage 163 connecting the first and second receiving compartments 143, 160 or the first receiving compartment 143 to a lower outer contour of the detent pin 122. In this case, a central axis K of the axial through passage 163 is arranged in the detent pin such that it is parallel to but spaced from a central axis Z of the detent pin 122 or an outer contour 40 formed at the latter. Thus one side of the detent pin at which a detent hook 29 or undercut 129 is formed for engaging with a spring element 46 of the airbag module 24 can be formed to have a larger wall thickness than in the case of a concentric design of the outer contour and the through passage, just as in the first afore-described embodiment.

Depending on the positioning of the detent pin on the steering wheel skeleton, after screwing in the stud bolt 154 a central axis B of the stud bolt 154 received in the through passage 163 is identical with or parallel to but spaced apart from the central axis Z of the detent pin 122 and/or identical with or parallel to but spaced apart from the central axis B of the through passage 163.

In the second embodiment of the steering wheel according to the invention described here a contact-free area 170 is formed between the detent pin 122 and the stud 154, especially between the stud 154 received in the axial through passage 163 and the first and/or second receiving compartment 143, 160 of the detent pin 122 and tightly screwed with the steering wheel skeleton 112.

Said area can be filled at least partially with a foam material of the foamed steering wheel cover 20, but it can also be empty (filled with air).

The contact-free area 170 extends along a peripheral area 171 of a shaft 155 and of a head 156 of the stud 154 so as to permit free positioning (in the predetermined range, preferably within the range of up to 2 mm) of the detent pin vis-à-vis the steering wheel skeleton.

According to the third embodiment shown in FIGS. 6 and 7, the contact-free area 170 in addition extends at least partially to a support area 157 of the head 156 located between the peripheral area 171 of the shaft 155 and the head 156 of the stud 154. Hereby a slight adaptation in height is additionally possible.

In particular, the detent pin 122 is fixed and positioned to the steering wheel skeleton 112 exclusively by the foamed steering wheel cover 20.

This is shown in FIGS. 6 and 7 which illustrate a perspective partly cut part view of the steering wheel and the airbag module before and after engagement according to the third embodiment of the invention. The detent pin is also spaced apart from the head of the stud bolt and is positioned and held on its support 113 on the steering wheel skeleton exclusively by the foamed steering wheel cover.

The detent pin is additionally held at the steering wheel skeleton by the head 156 of the stud bolt 154 merely in the case of release of the airbag.

In all embodiments of the invention the foamed steering wheel cover 20 encloses at least partially the detent pin or pins 22, 122 and the steering wheel skeleton.

The detent pin of all embodiments can have, as shown merely in the FIGS. 4 to 7, one (or two or more) projection(s) 139 for a horn contact 149 which upon interaction with the airbag module 24 closes or opens the horn contact upon pressing down the airbag module. Furthermore a second projection or second projections can be provided at the detent pin and/or at the airbag module for restricting the distance of pressing down to an admissible extent. Those projections are preferably integrally formed with the detent pin. Those projections and the detent pin preferably extend from a joint base plate which is supported on a support surface 113 on the steering wheel skeleton. Especially the detent pin (preferably with base plate and/or projections) is in the form of an injection-molded part made of plastic material.

The invention claimed is:

1. A steering wheel for receiving an airbag module (24) by means of a detachable snap-fit connection, wherein the steering wheel (10) includes a steering wheel skeleton (12, 112) and a foamed steering wheel cover (20) and wherein a detent pin (22, 122) having an interior compartment is provided as part of the snap-fit connection, wherein the detent pin (22, 122) is positively embedded in the foamed steering wheel cover (20) such that the foamed steering wheel cover (20) extends into the interior compartment to prevent relative movement between the detent pin (22, 122) and the foamed cover (20).

2. The steering wheel according to claim 1, wherein at the detent pin (22, 122) a first engaging contour (44) is formed which interacts with a corresponding second engaging contour (46) at the airbag module (24), wherein the first engaging contour (44) is a substantially tangential recess (44) in the detent pin (22, 122) and the second engaging contour is a spring wire (46).

3. The steering wheel according to claim 1, wherein at the detent pin (22) an engaging contour (36) is formed which interacts with a corresponding engaging contour (54) at the steering wheel skeleton (12), wherein the detent pin engaging contour (36) is a substantially radial, T shaped projection (30, 36) at a lower end of the detent pin (22) and the engaging contour at the steering wheel skeleton is a hook-shaped step (54) at the steering wheel skeleton (12).

4. The steering wheel according to claim 1, wherein the detent pin (22, 122) has a substantially cylindrical portion formed as a guide for a guiding sleeve (48) provided at the airbag module (24).

5. The steering wheel according to claim 1, wherein the detent pin (22, 122) includes an axial guiding portion having a recess (42) or an elevation (142) for receiving and guiding a compression spring (52) acting on the airbag module, the axial guiding portion being a separate insert (144) received in a cup-shaped receiving compartment (143) of the detent pin (122).

6. The steering wheel according to claim 1, wherein the detent pin (22, 122) is fixed at least in an axial direction additionally at the steering wheel skeleton (12, 122), the fixing being an engagement (36, 54).

7. The steering wheel according to claim 1, wherein at its upper end the detent pin (22, 122) has a first, cup-shaped receiving compartment (143) and at its lower end the detent pin (22, 122) has a second, inversely cup-shaped receiving compartment (160) in which a conical extension (162) of the steering wheel skeleton (112) is received, the detent pin (22, 122) including an axial through passage (163) that connects the first and second receiving compartments (143, 160).

8. The steering wheel according to claim 7, wherein the axial through passage (163) connects the first receiving compartment (143) to a lower, outer contour of the detent pin (22, 122).

9. The steering wheel according to claim 7, wherein a central axis (K) of the axial through passage (163) is parallel to but spaced apart from a central axis (Z) of the detent pin (122).

10. The steering wheel according to claim 7, wherein a central axis (B) of a stud bolt (154) received in the axial through passage (163) is one of coaxial with and parallel to but spaced apart from a central axis (Z) of the detent pin (122).

11. The steering wheel according to claim 7, wherein a central axis (B) of a stud bolt (154) received in the axial through passage (163) is one of coaxial with and parallel to but spaced apart from a central axis of the through passage (163).

12. The steering wheel according to claim 1, wherein a contact-free area (170) is formed between a bolt (154) screwed with the steering wheel skeleton (112) and received in an axial through passage (163) and first and second receiving compartments (143, 160) of the detent pin (122), the contact-free area (170) being at least partially filled with a foam material of the foamed steering wheel cover (20).

13. The steering wheel according to claim 12, wherein the contact-free area (170) is a peripheral area (171) of a shaft (155) and of a head (156) of the bolt (154) that extends at least partly to a support area (157) of the head (156) located between the peripheral area (171) of the shaft (155) and the head (156) of the bolt (154).

14. The airbag module for being fastened to a steering wheel (10) by means of a detachable snap-fit connection, the steering wheel (10) being formed at least according to claim 1 and the airbag module (24) including a plurality of guiding sleeves (48) as part of the snap-fit connection for receiving respective detent pins (22, 122).

15. An assembly comprising a steering wheel (10) for an automotive vehicle, an airbag module (24) and a detachable snap-fit connection for fastening the airbag module (24) to the steering wheel (10) according to claim 1.

16. The steering wheel according to claim 1, wherein the foamed cover (20) encapsulates an anchoring portion (30) of the detent pin (22, 122).

17. The steering wheel according to claim 1, wherein the detent pin (22, 122) is fixed at least in an axial direction additionally at the steering wheel skeleton (12, 122), the fixing being a screw joint (154, 156).

18. The steering wheel according to claim 1, wherein the detent pin (22, 122) has a substantially H-shaped cross-section.

19. A steering wheel for receiving an airbag module (24) by means of a detachable snap-fit connection, wherein the steering wheel (10) includes a steering wheel skeleton (12, 112) and a foamed steering wheel cover (20) and wherein a detent pin (22, 122) is provided as part of the snap-fit connection, wherein the detent pin (22, 122) is positively embedded in the foamed steering wheel cover (20) to prevent relative movement between the detent pin (22, 122) and the foamed cover (20), wherein the detent pin (22, 122) includes an axial through passage (163), a bolt (154) extending through the passage (163) being secured to the steering wheel skeleton (12, 112).

20. The steering wheel according to claim 19, wherein a foamed material of the foamed cover (20) extends within the detent pin (22, 122) between the bolt (154) and the detent pin (22, 122) to space the bolt (154) from the detent pin (22, 122).

\* \* \* \* \*